(12) United States Patent
Kuznetsov et al.

(10) Patent No.: US 9,448,081 B2
(45) Date of Patent: Sep. 20, 2016

(54) METHODS AND SYSTEMS FOR DYNAMICALLY ADAPTIVE ROAD NETWORK HIERARCHY AND ROUTING

(75) Inventors: Tsia Kuznetsov, Cupertino, CA (US); Ilya Sandler, Cupertino, CA (US); Edward Suranyi, Union City, CA (US)

(73) Assignee: TomTom North America, Inc., Lebanon, NH (US)

( * ) Notice: Subject to any disclaimer, the term of this patent is extended or adjusted under 35 U.S.C. 154(b) by 721 days.

(21) Appl. No.: 12/736,783

(22) PCT Filed: Apr. 9, 2009

(86) PCT No.: PCT/US2009/039983
§ 371 (c)(1),
(2), (4) Date: Jan. 7, 2011

(87) PCT Pub. No.: WO2009/158058
PCT Pub. Date: Dec. 30, 2009

(65) Prior Publication Data
US 2011/0113155 A1    May 12, 2011

Related U.S. Application Data

(60) Provisional application No. 61/075,285, filed on Jun. 24, 2008.

(51) Int. Cl.
*G01C 21/34* (2006.01)
(52) U.S. Cl.
CPC ....... *G01C 21/3446* (2013.01); *G01C 21/3492* (2013.01)
(58) Field of Classification Search
CPC .... G01C 21/26; G01C 21/265; G01C 21/34; G01C 21/3407; G01C 21/3446
See application file for complete search history.

(56) References Cited

U.S. PATENT DOCUMENTS

| 5,272,638 | A | | 12/1993 | Martin et al. | |
|---|---|---|---|---|---|
| 5,513,110 | A | * | 4/1996 | Fujita et al. | 701/410 |

(Continued)

FOREIGN PATENT DOCUMENTS

| EP | 0854353 A2 | 7/1998 |
|---|---|---|
| EP | 1839289 A1 | 10/2007 |

(Continued)

OTHER PUBLICATIONS

International Search Report.

(Continued)

*Primary Examiner* — Thomas Tarcza
*Assistant Examiner* — Richard Goldman (57) ABSTRACT

A system and method for computing routing on a road network are described. One embodiment includes pre-processing routing data for one or more environmental profiles integrated into a hierarchy, dynamically adding links to the hierarchy in response to real-time data on traffic conditions, and cluster-routing to approximate routing travel costs based on realtime traffic data A further embodiment includes a) identifying one or more portions of a road network as being more preferable than normal based on real-time data, b) expressing the one or more portions of the road network as a sequence of locations comprising a uniquely identifiable path, c) using the sequence of locations comprising a uniquely identifiable path to add one or more links to an already constructed hierarchical network of roads, and d) enabling a pathfinding algorithm to adjust to the real-time data.

15 Claims, 9 Drawing Sheets

(56) References Cited

U.S. PATENT DOCUMENTS

| | | | |
|---|---|---|---|
| 5,938,720 A | 8/1999 | Tamai | |
| 6,016,485 A | 1/2000 | Amakawa et al. | |
| 6,216,086 B1* | 4/2001 | Seymour et al. | 701/533 |
| 6,456,934 B1* | 9/2002 | Matsunaga et al. | 701/418 |
| 6,587,785 B2 | 7/2003 | Jijina et al. | |
| 7,526,377 B2* | 4/2009 | Wiener et al. | 701/414 |
| 7,617,046 B2* | 11/2009 | Tomita et al. | 701/423 |
| 7,653,480 B2* | 1/2010 | Tsuge et al. | 701/117 |
| 7,908,080 B2* | 3/2011 | Rowley et al. | 701/423 |
| 8,355,870 B2* | 1/2013 | Link et al. | 701/533 |
| 8,589,077 B2* | 11/2013 | Obert | 701/533 |
| 2001/0037305 A1* | 11/2001 | Mochizuki | 705/52 |
| 2001/0047241 A1 | 11/2001 | Khavakh et al. | |
| 2002/0120388 A1* | 8/2002 | Bullock | 701/117 |
| 2003/0195701 A1* | 10/2003 | Ohler | 701/209 |
| 2004/0249559 A1 | 12/2004 | Mintz | |
| 2005/0222763 A1* | 10/2005 | Uyeki | 701/210 |
| 2005/0234640 A1* | 10/2005 | Hiyokawa et al. | 701/210 |
| 2006/0067331 A1* | 3/2006 | Kodialam et al. | 370/395.41 |
| 2007/0135990 A1* | 6/2007 | Seymour et al. | 701/117 |
| 2008/0177460 A1* | 7/2008 | Blackwood et al. | 701/118 |
| 2009/0254266 A1* | 10/2009 | Altrichter et al. | 701/200 |
| 2010/0076671 A1* | 3/2010 | Pryakhin et al. | 701/119 |
| 2010/0121565 A1* | 5/2010 | Uyeki et al. | 701/201 |
| 2010/0191455 A1* | 7/2010 | Sugawara | 701/201 |
| 2010/0312466 A1* | 12/2010 | Katzer et al. | 701/201 |
| 2011/0029230 A1* | 2/2011 | Kimura | 701/201 |
| 2011/0184640 A1* | 7/2011 | Coleman et al. | 701/201 |
| 2011/0320112 A1* | 12/2011 | Anderson | 701/119 |
| 2013/0046456 A1* | 2/2013 | Scofield et al. | 701/117 |
| 2013/0080046 A1* | 3/2013 | Jeong et al. | 701/408 |
| 2013/0116882 A1* | 5/2013 | Link et al. | 701/31.4 |
| 2013/0204528 A1* | 8/2013 | Okude et al. | 701/533 |
| 2013/0261960 A1* | 10/2013 | Wu et al. | 701/465 |
| 2014/0074392 A1* | 3/2014 | Holm et al. | 701/400 |

FOREIGN PATENT DOCUMENTS

| | | |
|---|---|---|
| JP | 2007052341 A | 3/2007 |
| JP | 2007327970 A | 12/2007 |

OTHER PUBLICATIONS

Hector Gonzalez et al: 11 Adaptive fastest path computation on a road network: a traffic mining approach 11, Proceedings of the 33rd International Conference on Very Large Data Bases (VLDB I 07). Sep. 23, 2007, pp. 794-805, XP055071532, ISBN: 978-1-59-593649-3 sections 1,2,3,6,8.

Extended Search Report dated Oct. 12, 2015 for European Application No. 09770593.3, filed on Apr. 9, 2009.

\* cited by examiner

FIG. 1

Dijkstra's Shortest Path

FIG. 2

Bi-Directional Search

FIG. 3

Bi-Directional A*

METHODS AND SYSTEMS FOR DYNAMICALLY ADAPTIVE ROAD NETWORK HIERARCHY AND ROUTING

This is a National Phase of PCT Patent Application No. PCT/US2009/039983, filed on Apr. 9, 2009, which claims priority under 35 U.S.C. §365(c) and 119(e) to U.S. Provisional Application No. 61/075,285, filed on Jun. 24, 2008, the contents of each of which are hereby incorporated herein by reference in their entirety.

FIELD OF THE INVENTION

The present invention relates to digital map databases and systems that use such digital map databases, including Geographic Information Systems (GIS), Navigation Systems (embedded, PDA, wireless), Internet applications, etc., and particularly techniques for optimizing a search for best paths on road networks.

SUMMARY OF THE INVENTION

Embodiments of the invention include systems and methods for computing routing on a road network. Embodiments include pre-processing routing data for one or more environmental profiles integrated into a hierarchy; dynamically adding links to the hierarchy in response to real-time data on traffic conditions; and cluster-routing to approximate routing travel costs based on real-time traffic data.

BRIEF DESCRIPTION OF THE DRAWINGS

Embodiments of the present invention will be described in detail based on the following figures, wherein.

DETAILED DESCRIPTION OF THE INVENTION

Electronic maps are often prepared in stages. Paths from one region to another region may be pre-computed. Pre-computation of a path between regions decreases response time when a traveler desires a fast response. In this context, the decreased response time means that the responsiveness of the system is increased, and the time to respond is thereby decreased. Pre-computation is particularly helpful when the computations required for a path are complex and involved.

However, a certain amount of computations are still performed in response to a request at run-time. This results in a process where part of the path-finding process is computed ahead of time and incorporated into the map application. Later, a traveler enters information including an origin and a destination, and the path-finding application determines a route, taking advantage of pre-computed routes where relevant.

A history of path algorithms should include Dijkstra's shortest path. An electronic map can be a directed graph: a collection of nodes and links with a cost assigned to each link. The least cost path between an origin and a destination would minimize the total of the costs of the links in the route. In the directed graph, every decision point could be a node. Every transition from one node to another is a link. Many optimizations to the path-finding process are possible, to reduce computational complexity and to increase response time.

Figure 1:
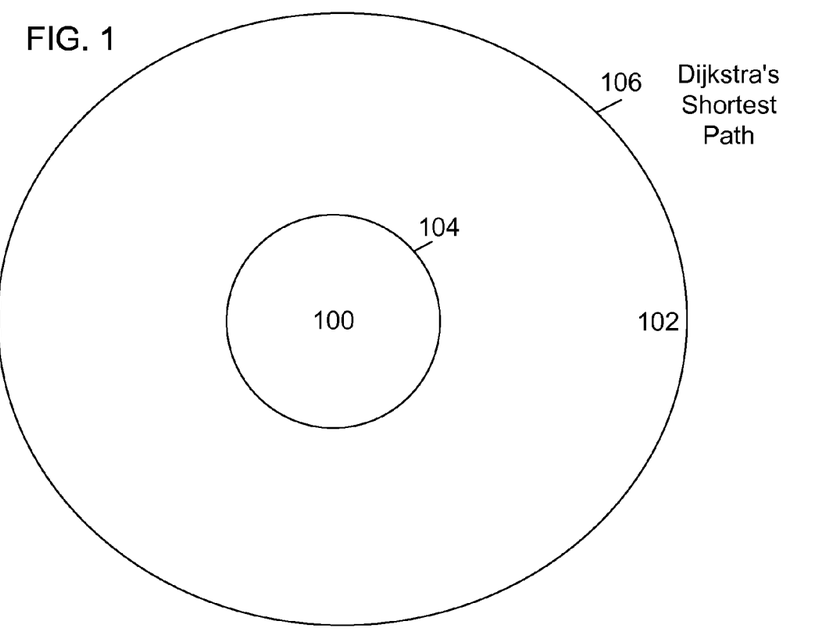
FIG. 1 is an illustration that shows an example of path-finding from an origin to a destination.

Dijkstra's original method is a one-directional path search where the search propagates from the origin in a wave-like shape until the destination is covered by the wave front. Dijkstra's algorithm solves the single-source shortest path problem, outputting a shortest path tree. Assume that FIG. 1 is overlaid across a map of city streets, and that a route is sought to go from origin 100 to destination 102. Applying Dijkstra's algorithm to the shortest path problem, the search will radiate in all directions. When the path-finding process reaches a radius 104, the path-finding process has explored in all directions but not yet found destination 102. When the path-finding process reaches radius 106, the destination 102 has been found.

Figure 2:
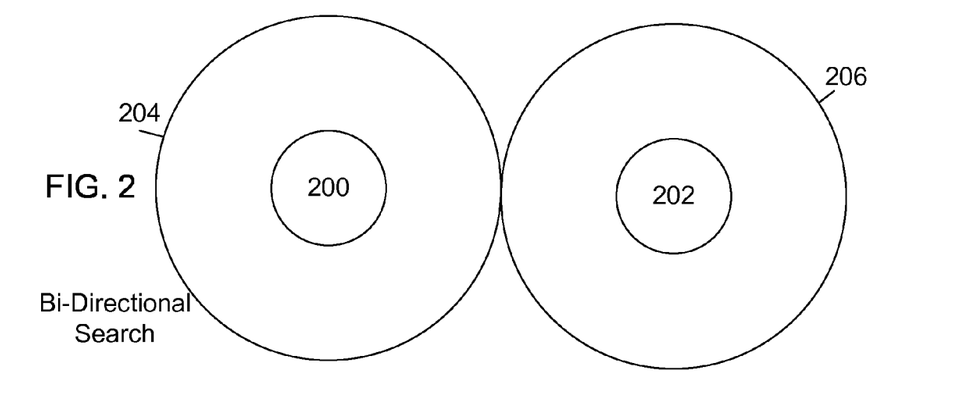
FIG. 2 is an illustration that shows an example of bi-directional path-finding.

A bi-directional search has the search propagate from both the origin and the destination until the waves overlap. Bi-directional searching reduces the search area and computation time by one-half. Each of the two searches has complexity $O(b^{d/2})$, and $O(b^{d/2}+b^{d/2})$ is less than the running time of one search from the origin to the destination, which would be $O(b^d)$. Shown in FIG. 2 is an example of applying bi-directional search to go from origin 200 to destination 202. When the search 204 from origin 200 intersects the search 206 from the destination 202, the shortest path has been found. Although the distance between 200 and 202 is comparable to the distance between 100 and 102, the area of the search is one-half the size with the bi-directional search algorithm.

Figure 3:
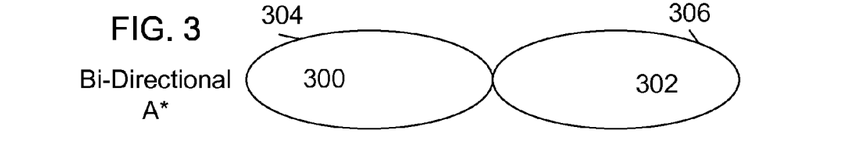
FIG. 3 is an illustration that shows an example of a bi-directional heuristic approach to path-finding.

The A* algorithm focuses the search to favor exploration toward the destination, further reducing the search area and computation time. A* is a graph search algorithm that finds the least-cost path from an origin node to a destination node. A* uses a heuristic function to determine node costs and thus the order in which the search visits nodes in the tree. Shown in FIG. 3 is an example of applying a bi-directional A* algorithm to go from origin 300 to destination 302. When the search 304 from origin 300 intersects the search 306 from the destination 302, the shortest path has been found. The distance between 300 and 302 is comparable to the distance between 100 and 102, yet the area of the search has been considerably reduced using a bi-directional A* algorithm.

A hierarchical model can provide additional optimizations. Node priority explains the routing importance of a node and its place in the network hierarchy. The goal of the path-finding algorithm is to minimize costs. The cost of a link can be time, distance, or involve other factors. Links are assigned costs based on optimization criteria. A cost classification system can have many levels, allowing it to distinguish roads, highways, alleys, driveways, ramps, non-ramps, toll roads, ferries, borders, etc. Costs can be adjusted by multiplying distance by cost-per-distance. A link can have multiple cost classes simultaneously, for instance it could be classified as high priority in a hierarchical model and also be limited access. Some cost classes (toll roads, ferries, etc.) may have additional controls. The search then propagates from node to node, driven by the minimum cost of nodes explored.

RDS TMC (Radio Data System—Traffic Message Channel) is a globally acknowledged standard for broadcasting traffic data over the RDS sub-carrier on FM radio. The data is coded in accordance with the TMC standard and is decoded by a mapping system to provide information relevant to the location and/or route of the traveler.

Japan is developing a vehicle information and control system (VICS). VICS is a program with the goals of resolving the competition between road/automobile communication system (RACS) and advanced mobile traffic information and communications system (AMTICS), and defining a common system using the best features of both. One proposal is a digital micro cellular radio system to provide two-way road-vehicle communications and location information, essentially combining the tools used by each respective system. A RACS-AMTICS system using RACS Type 1 beacons and the broadcast of information to drivers via their FM car radios (like Radio Data System-Traffic Message Channel (RDS-TMC)) is another option.

The International Organization for Standardization (ISO) has created standard ISO 17572-3 Intelligent Transport System-Location Referencing for Geographic Databases-Part 3: Dynamic Location References, also known as AGORA-C. This standard is designed to support machine-to-machine location descriptions optimized for size efficiency and robust autonomous decoding. As a dynamic method, AGORA-C anticipates differences between map versions at the time of decoding. The AGORA-C standard is designed to allow the development of enhanced navigation services, including the replacement of TMC. AGORA-C specifies a method for dynamic encoding of location references and decoding them into any map regardless of vendor or version, without requiring predefined location codes or lookup tables. Location references are the unique identification of geographic objects such as road junctions, exit ramps, and postal addresses.

To account for traffic flow, most commercial systems rely on pre-defined sets of location codes that reference road entities via location identifiers that are either a government or industry standard shared between map data and application providers. Traffic events that affect data flow are typically described via TMC format (US and Europe) or VICS (Japan). The need for pre-assigned location codes naturally limits such systems to a relatively small subset of locations at most important intersections. Most routing engines are able to cope with a small amount of dynamically modified data. Some routing engines compute a path first, then check to determine if a traffic event warrants notification or re-computing.

The cost to synchronize and maintain limited location tables becomes increasingly less attractive as traffic providers amass historical probe data and algorithms capable of predicting speed patterns for a given link on a given week day, date, and time interval for the network at large, not just select TMC segments. Progress has also been made in dynamic location referencing with the ISO approving the first draft of the AGORA-C based Location Referencing Standard.

AGORA-C, VICS, and RDS/TMC are examples of dynamic location referencing standards. Other standards are contemplated. Embodiments of the invention utilize dynamic data provided by location referencing methods. Embodiments of the invention are not limited to the location referencing standards described herein.

Real-time traffic data is likely to increase in size and scale to the point where current algorithms will not be able to efficiently process the data in a reasonable time. In the near future, sensors will be transmitting data on traffic conditions on a greater number of roads than ever before. Generic Positions Systems and enhanced position determination systems for navigation systems will not only allow vehicles to determine their position, but with the aid of two-way communications, allow traffic data providers to determine the position of such equipped vehicles, and determine the current traffic conditions affecting them. There can be more than a GPS receiver in a navigation system (could include INS, Dead Reckoning, etc.). Also there are other Global Navigation Satellite Systems (GNSS) now or soon to be available, other than GPS.

Some embodiments of the invention enable path-finding to take into account real-time data, including traffic incidents and events such as protests, which may also have an impact on routing. Routing algorithms on large, small, and embedded platforms will be able to use this massive volume of dynamic cost data efficiently. Some embodiments of the routing algorithm technology described herein resolve problems with the very things that made fast routing possible: map data hierarchy and bi-directional focused search: the problems which arise due to the huge volume of fully dynamic link traversal costs.

Link cost is fundamental to routing algorithms. A common goal is to compute shortest travel time. When a search is optimized for a shortest travel on a road network, link cost can be expressed in speed of traversal or time required to traverse that link at the time of travel on that link. A link is defined as a segment of road between two decision points. A node is a decision point on the road network reached from a specific link.

A road network forms a natural hierarchy since roads differ in importance, throughput and posted speed. Many routing algorithms rely on this implicit hierarchy to maintain level of detail appropriate in the context of travel distance and specifics of the road network. Natural road hierarchy is often imperfect for routing since occasionally roads of lesser significance are instrumental as shortcuts between more important roads for computing paths that travel some distance. An advanced routing database application can pre-compute hierarchy for run-time performance such that only a fraction of the graph needs to be processed to compute a path.

Parallel Profiles for a Pre-Computed Routing Hierarchy

When cost is optimized for speed of travel, routing algorithms tend to abandon roads of lower importance as the routing algorithms propagate away from the origin and destination in favor of progressively more important roads, until the only roads left in the view of the routing algorithms are freeways. The further the destination, the higher the percentage of miles on a freeway. Pre-computed hierarchy conveniently enables retrieval of just the right subset of roads. Pre-computed hierarchy assumes that speed of travel grows with road importance.

For example, a morning commute brings traffic flow on a road to a halt, whereas an afternoon commute allows traffic at maximum speed. Similarly, roads leading to or away from a congested road may be affected in one direction but not another. Yet if a hierarchy is built based on the maximum speed limit for the road, the result will not always be satisfactory.

When pre-computed data is stored in a relational database management system (RDBMS), highways that represent a small fraction of the road network can be updated without too much of a performance impact. However, promoting lower priority roads at run-time might prove challenging even for large-scale installations, due to the sheer number of roads at the lower levels; the performance impact will simply be too large for the system.

Under severe traffic conditions, some systems resolve to not use the upper levels of the tree, which negatively impacts response time and number of paths computed per second, while commercial fleet operators may maintain different routing databases for "regular," "morning," and "afternoon" commutes.

Traffic events can generate a huge volume of dynamic link costs which a typical pre-computed hierarchy for a map application would not be able to handle efficiently. One embodiment of the invention solves this problem using a method of dynamically adaptive hierarchy.

Figure 4:
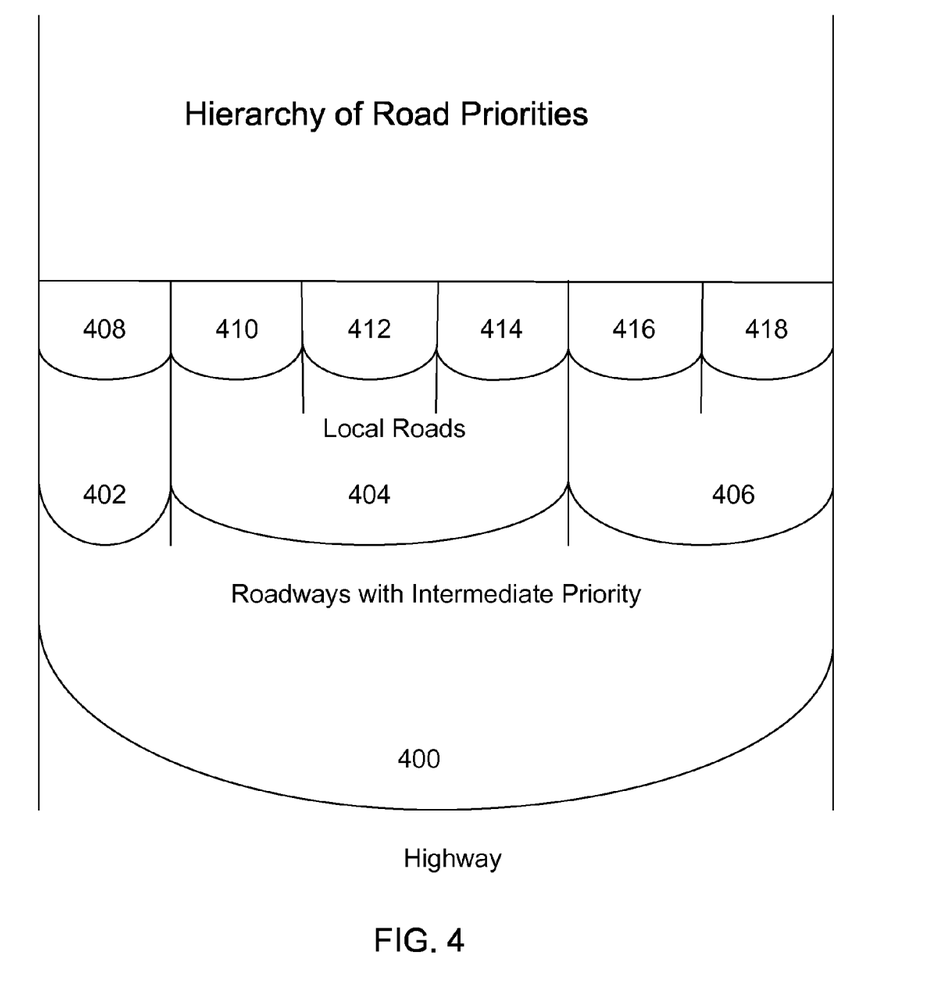
FIG. 4 is an illustration that shows a hierarchy of road priorities between nodes.

U.S. Pat. No. 6,885,937 describes a shortcut generator that augments a digital map with additional links at higher levels so as to enable a hierarchical routing algorithm to be more efficient. A typical hierarchical routing algorithm example is shown in FIG. 4. Roadway 400 has the highest priority and is a freeway allowing the highest rate of speed. Roadways 402, 404, and 406 have intermediate priority and permit an intermediate speed. Local roads 408, 410, 412, 414, 416, and 418 are roads that have stop lights, stop signs, and other difficulties that reduce their desirability. At higher levels of the hierarchy, as roads of lower priority drop out, links between the higher priority nodes cover increasingly longer distance. If a route is intended to cover quite a distance, the path-finding algorithm may optimize by considering roadway 400 and roadways 402, 404, and 406, but not considering the local roads 408, 410, 412, 414, 416, and 418. The shortcut generator described in U.S. Pat. No. 6,885,937 allows local roads to be promoted in priority for path-finding consideration if the local road is a desirable short cut between two roads of higher priority. For example, if a local road connects two high speed highways, the short cut generator may promote the local road to be considered by the path finding algorithm.

As with other map hierarchies, the shortcut generator method on static road classification does not work so well when there are unpredictable differences in cost between map provider assumed speed limits, and actual or predicted speed for a given link at the time of intended use. There are two major sources of these unpredictable differences:

At the time a route is calculated, link costs, because of current actual traffic, historic traffic patterns, or predicted traffic information may be different than what the link costs were assumed to be when the data was built.

A road which has been given a high priority may in fact be prohibited to trucks with hazardous material, so a path that includes a prohibited road will not work for the particular vehicle. Another example of a time or vehicle restriction may be for HOV lanes, which are only available at certain times of day for certain vehicles.

Embodiments of the invention propose a solution to these problems. Instead of running the shortcut generator only once, as described in the above-mentioned patent, embodiments of the invention run the shortcut generator multiple times, with a different "profile" each time. The first profile is a standard profile with no cost modifications. In one embodiment, environmental profiles are based on dynamic, user, and/or environmental parameters.

For historical traffic, time intervals with non-meaningful rate of change are compressed into fewer profiles, then the shortcut generator is run for each reasonable segment of time, depending on how many profiles are desired. In one example, ten profiles are created to cover morning rush hour traffic, evening rush hour traffic, non-peak hour weekday traffic, weekend traffic, and other typical profiles. One embodiment creates a profile for every half-hour time period during the days of the week. The profiles are then compared based on similarities, and consolidated into a smaller set of profiles. Time slots for an environmental profile can be arbitrary, be it periodic (hour, half-hour, 15 min, etc.) or not (midnight-6, 6-10, 10-3, 3-7, etc.).

In an alternative embodiment, a logistics product is produced. In this embodiment, the first profile has standard costs and no restrictions. The second profile is all roads on which trucks are prohibited or disallowed. A third profile is all roads on which hazardous material is prohibited or disallowed. As many additional profiles would be created as business logic requires.

Generally, the more profiles, the more exact the solution produced by the algorithm. It should not take more than ten profiles to cover the vast majority of cases. Even if a particular circumstance does not match a profile exactly, the richness of the hierarchy is likely to provide for good alternatives. One embodiment may integrate dynamic, user, and environmental parameters in a single hierarchy.

Once the shortcut generator builds the separate profiles, the next step is to merge all the profiles into one final result. The way this is done is that every node has the maximum priority of the value it has among all the profiles, and if a compound link (aggregation of simple links) exists in any of the profiles, then the compound link also exists in the final result. A compound link may represent one or more links with the new priorities. These compound links represent the shortcuts generated by the shortcut generator. Since many profiles in effect promote the same links, the intended consequences are that even profiles that were not run via the shortcut generator have a good chance to be well represented in the result.

The final result is not simply a way of efficiently storing the whole 10 situations, still to be used as 10 different situations but rather it is one database with sufficient complexity so that efficient routing can be done at any time of day because, regardless of the nature of the traffic conditions, the network has all of the shortcuts pre-built. Then the system still has a reasonably sparse network (at the upper levels) but sufficiently dense to include the shortcuts needed for "bad traffic" options. Then dynamic traffic can be used as link weights in real time (efficiently) without the need to reconstruct the hierarchy.

Some other industry solutions disable promotion to the highest levels of static data derived hierarchy, when these levels are rendered ineffective by traffic events, leading to routing failure. These alternative approaches enlarge the number of links that must be considered beyond what is necessary under the approach of embodiments of the invention. Embodiments of the invention offer two-fold improvement: embodiments limit the number of lower level links available for routing consideration at higher levels to just those that are feasible, while also aggregating the lower level links into longer stretches (compound links) as appropriate for a given level of hierarchy.

In one embodiment, the same algorithm is applied to enhance routing hierarchy for multiple link costs due to toll/ferry/border crossing avoidance, multiple vehicle profiles vis-á-vis travel restrictions, and/or a combination of such dynamic, user, or environmental parameters.

Dynamically Adaptive Hierarchies

Occasionally road authorities or dynamic conditions may suggest a detour not present at the proper levels of hierarchy. For instance, traffic could be temporarily diverted to a local road as a way to bypass construction or an emergency site. One embodiment of the routing system dynamically adjusts the hierarchy in the following manner.

In one embodiment, information describing a hierarchical network of roads is stored in a database. A data provider can identify portions of the hierarchical network of roads which at a particular time may be more preferable than is the case normally, and can express it as a sequence of locations comprising a uniquely identifiable path. These portions of the hierarchical network of roads then are added as a link or multiple links to a hierarchical network of roads at run-time. In one embodiment, real-time data on traffic conditions is supplied by an external source (via RDS TMC, AGORA-C, VICS or similar traffic information system).

In one embodiment, Dynamically Adaptive Hierarchies involves adding new links at run-time to a pre-computed hierarchy. At build, time the network builder generates cross-reference tables, which map final network IDs as used by a traffic data provider into road network IDs as used by routing software (both for links and nodes). In one embodiment, this cross-reference data is stored in a data base with fast random access. At run-time, when real-time traffic information requires detours, this information is used to identify which nodes in the existing network need to be modified. A single detour can result in multiple links being added at different levels of hierarchy, equipped with a proper priority and compounded as appropriate for each level. These new links are supplied to the routing algorithm in exactly the same way as already existing links, thus the routing algorithm does not need to be modified.

AGORA-C does not have network ids, but instead relies on a somewhat free form road element description/referencing. For AGORA-C and similar referencing systems, a cross-reference table can not be created. Instead the affected geometry has to be identified by a run-time decoding process.

These new links, based on dynamic data, enable the path-finding algorithms to adjust to real-time traffic events requiring detours. The same method allows the incremental compilation of one or more profiles into an already existing branch of hierarchy, which may be needed when large parts of network have modified traversal times due to a natural disaster or some such event.

Bi-Directional Focused Routing

Bi-directional routing is employed to reduce propagation area (and thus number of nodes and compute time) roughly by half. Focused routing further reduces the search area by favoring propagation towards the origin or the destination. In Dijkstra's shortest path algorithm, the least cost node on the wave front has a property that its optimal path is already found, and therefore time of arrival from the origin of the wave, when optimizing travel time. In a focused A*, cost of a node on the wave front is a sum of travel cost from the center of the wave to the node, and an estimated cost to the center of the opposite wave front, usually computed using some heuristics. Propagation from the least cost node on every step is fundamental to finding the least cost path.

Travel time-dependent link costs pose a problem for propagation: since the best path from an origin to that node on the destination wave front is not yet found, its cost and thus time of arrival at that node are not known, therefore a proper link cost can not be identified. For example, if a route is being planned to leave the origin at 3:30 pm, the traffic conditions near the origin can be predicted based on historical data to compute the wave front leaving the origin. However, since the path-finding process has not yet been completed, it is unknown what time to use for traffic conditions near the destination when computing the costs for the wave expanding from the destination.

Traditional algorithms are performed on a static graph where cost values are constant. The traditional algorithms were more efficient because they ignored the dynamic nature of these costs. It is possible to modify A* algorithm to work with time-dependent link costs, by creating a bigger static graph that takes into consideration time-dependent cost values. However, the volume of such modified graph would be an order or two magnitudes bigger than the original static graph. As a consequence, computation time to calculate the route would increase accordingly in an unacceptable manner.

Another way to solve the problem would be to identify minimum-maximum time intervals to arrive at the node, and average link costs for these intervals, which might work for a short path. Longer paths in bad traffic conditions may have unreasonably large intervals and require a more reliable approach.

Cluster Cost Approximation Method

Contrary to the static approach, one embodiment recognizes dynamic routing as a task of approximation, while trying to extract a reasonable path reasonably quickly under constantly changing, traffic conditions.

One embodiment begins by partitioning the routing network into logical clusters. It is not important for this discussion which method is used for that. In one embodiment, a quad tree is utilized. For simplicity let's assume a logical cluster tree with a subdivision criteria as a function of road density per square mile, traffic congestion, travel frequency, or a similar criteria. Alternative embodiments use similar criteria typical in spatial indexes. Each cluster has a spatial extent and stores travel time to the neighboring clusters; the travel times are pre-computed from historical or predictive data, and/or dynamically maintained from real-time data probes. This produces a simplified graph for cluster to cluster routing with costs that depend on time of travel.

In one embodiment, navigation systems can compute how long it takes a vehicle with a navigation system to travel across the roads. The network knows how long it took a vehicle to cross the map because of the run-time probe data. When the map is divided into clusters, it can be estimated how long it will take to go from one cluster to another cluster based on the run-time probe data from a plurality of vehicles traveling from a cluster to a cluster.

The path origin node resides in the cluster called the origin cluster, and the path destination node resides in the destination cluster. In some embodiments, due to the minuscule size of this graph, a one-directional Dijkstra algorithm can be used to compute a path on this cluster graph. Since each node in the road network graph falls into some cluster, results from this computation will give an approximate time, in the direction of travel, between a node's cluster and the cluster where the center of the opposite wave front belongs.

In the destination wave front, this value is used in place of a time estimate to arrive at a node, which in turn will enable selection of an appropriate link cost value. Then the heuristics are substituted to estimate cost from a node to the center of the opposite wave front by the approximate cost of travel, in the direction of routing, from a node's cluster to the cluster where the center of the opposite wave front belongs. When nodes from opposing wave fronts make connections, approximate costs on the target wave are substituted by a newly computed cost of an actual path from the origin.

The rest of the bidirectional A* algorithm will proceed as usual.

On the server, where many different path requests may have the same origin and destination clusters, results of cluster routing, that is, cluster-to-cluster costs, could be re-used until costs between some of the clusters in the region have changed.

Figure 5:
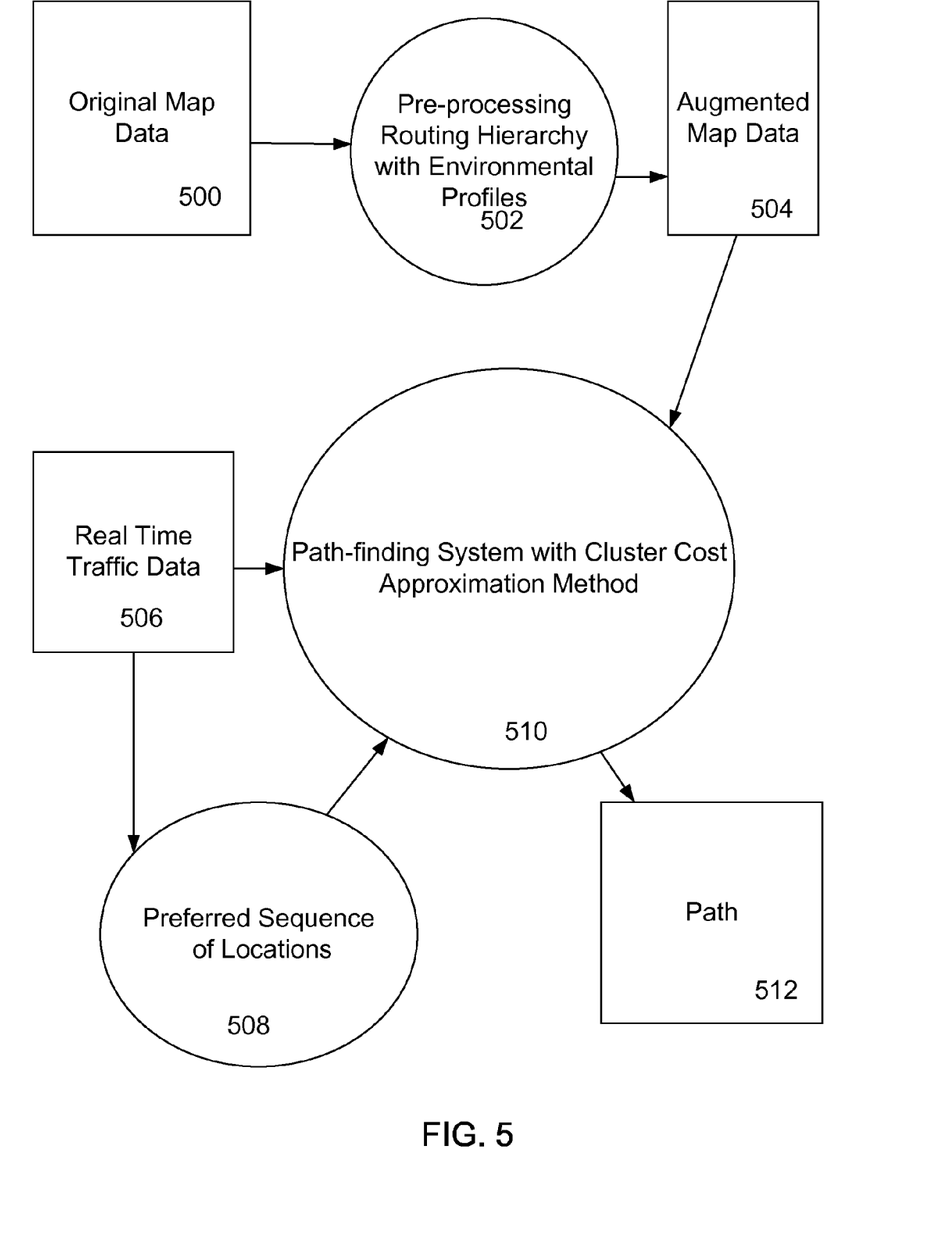
FIG. 5 is a high-level architecture of one embodiment.

FIG. 5 shows a high level architecture of one embodiment. Original electronic map data 500 is pre-processed in a hierarchy with environmental profiles 502. In one embodiment, the routing hierarchy is processed multiple times by a shortcut generator. In one embodiment, ten profiles are created to cover morning rush hour traffic, evening rush hour traffic, non-peak hour weekday traffic, weekend traffic, and other profiles. The profiles are then merged into a final result, producing augmented map data 504. The augmented map data is then delivered to the path-finding system 510. Real-time traffic data 506 is used to generate a preferred sequence of locations 508 to determine which links and nodes in the road network to modify based on real-time traffic conditions. The path-finding system 510 then uses the augmented map data with parallel profiles and the dynamically updated links with the cluster cost approximation method to compute a route 512.

Figure 6:
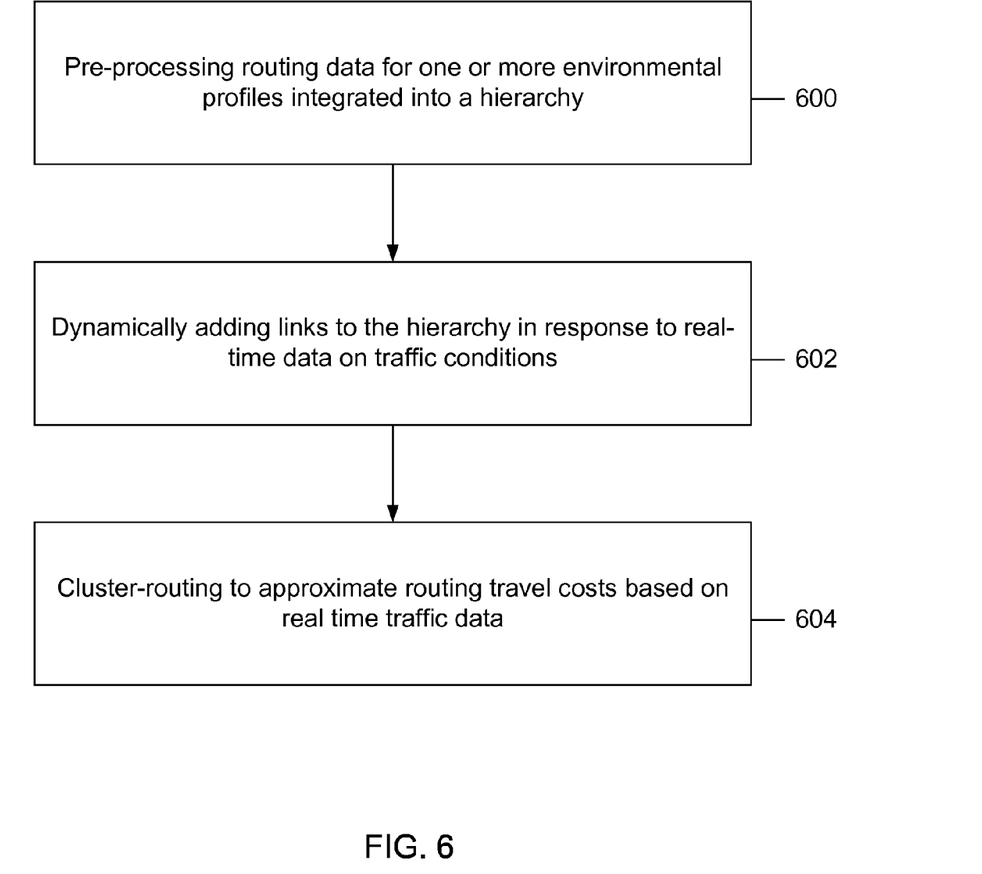
FIG. 6 is a flowchart that shows a method for one embodiment.

FIG. 6 shows a flow chart for one embodiment, which is a method for computing routing on a road network. The method includes a step 600 of pre-processing routing data for one or more environmental profiles integrated into a hierarchy. The method includes a step 602 of dynamically adding links to the hierarchy in response to real-time data on traffic conditions. The method includes a step 604 of cluster-routing to approximate routing travel costs based on real-time traffic data.

Figure 7:
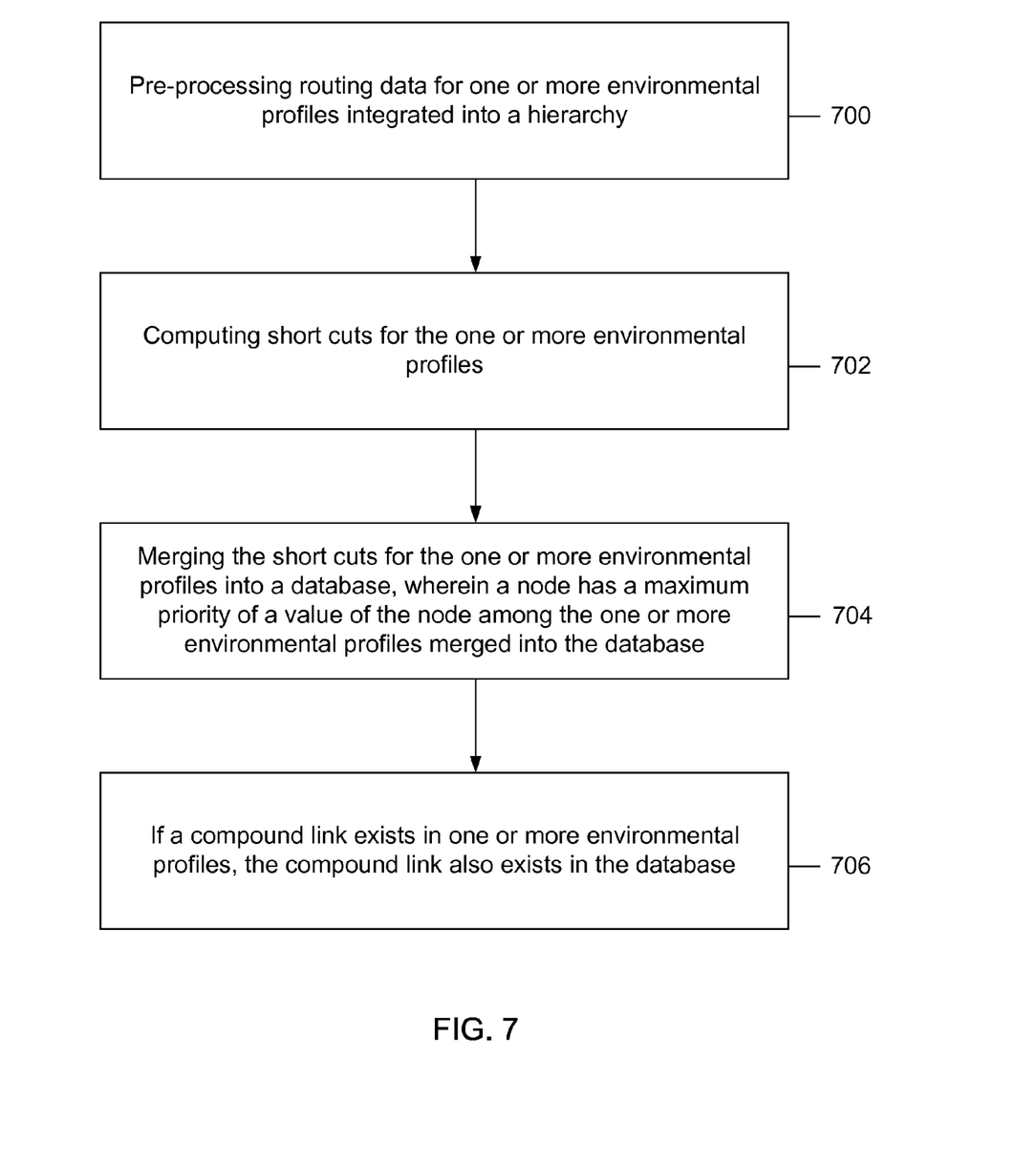
FIG. 7 is a flowchart that shows a method for one embodiment.

FIG. 7 shows a flow chart for one embodiment, which is a method for improving computation of routing on a road network. The method includes a step 700 of pre-processing routing data for one or more environmental profiles integrated into a hierarchy. The method includes a step 702 of computing short cuts for the one or more environmental profiles. The method includes a step 704 of merging the short cuts for the one or more environmental profiles into a database, wherein a node has a maximum priority of a value of the node among the one or more environmental profiles merged into the database. The method further provides 704 that when a compound link exists in one or more environmental profiles, the compound link also exists in the database.

Figure 8:
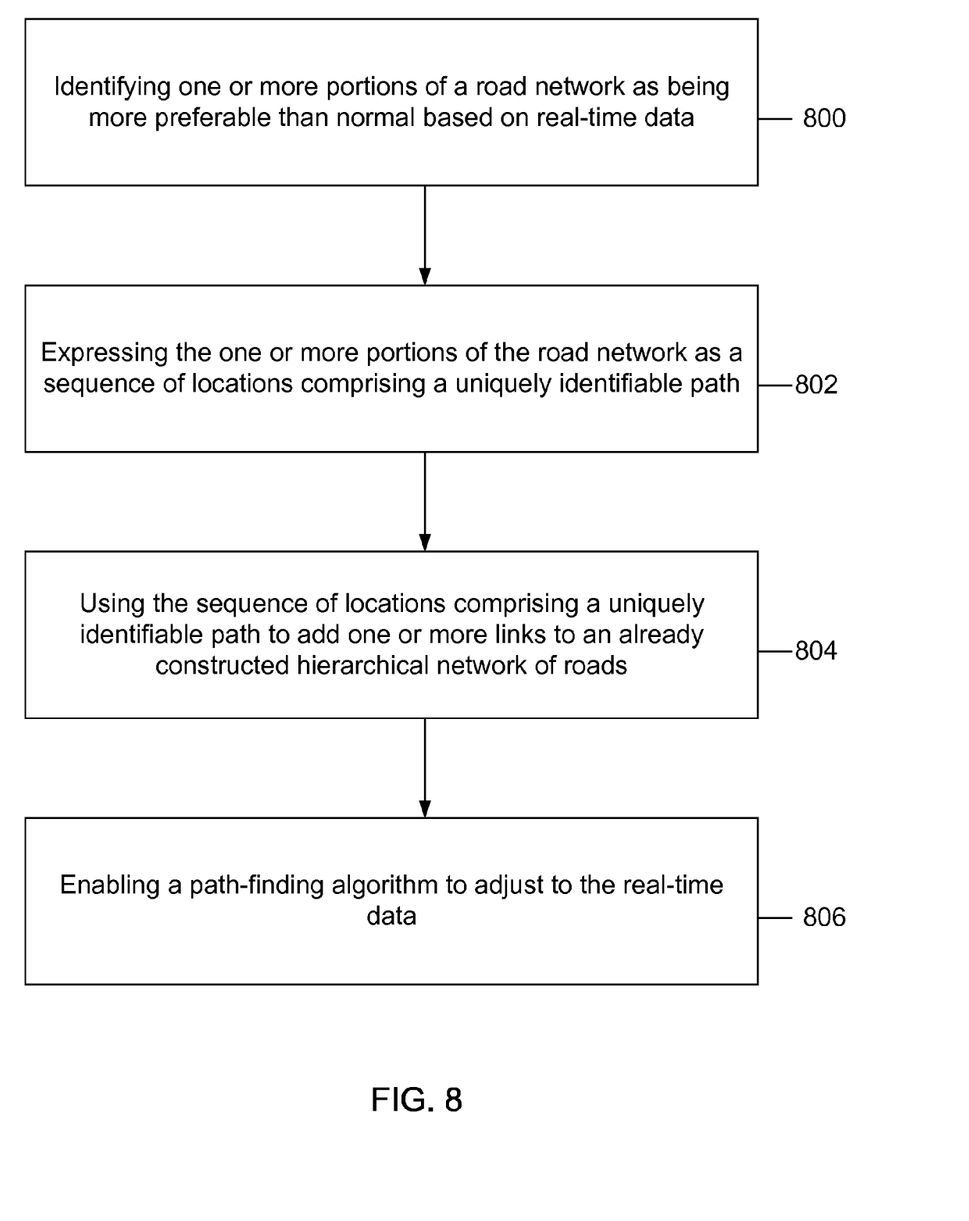
FIG. 8 is a flowchart that shows a method for one embodiment.

FIG. 8 shows a flow chart for one embodiment, which is a method for dynamically adding new links to an already constructed hierarchical network of roads. The method includes a step 800 of identifying one or more portions of a road network as being more preferable than normal based on real-time data. The method includes a step 802 of expressing the one or more portions of the road network as a sequence of locations comprising a uniquely identifiable path. The method includes a step 804 of using the sequence of locations comprising a uniquely identifiable path to add one or more links to an already constructed hierarchical network of roads. The method includes a step 806 of enabling a path-finding algorithm to adjust to the real-time data.

Figure 9:
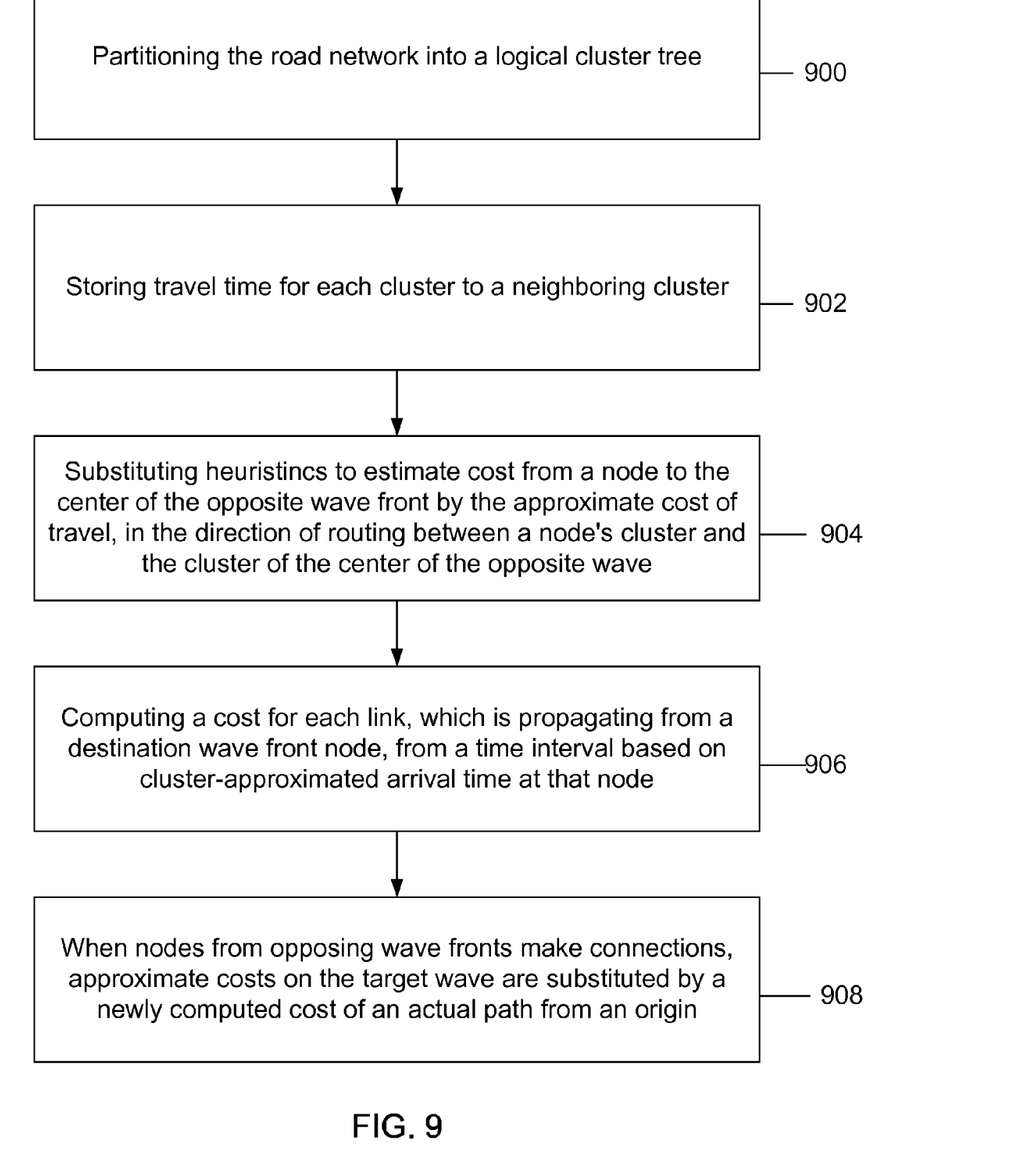
FIG. 9 is a flowchart that shows a method for one embodiment.

FIG. 9 shows a flow chart for one embodiment, which is a method for improving computation of vehicle navigation on a road network. The method includes a step 900 of partitioning the road network into a logical cluster tree. The method includes a step 902 of storing travel time for each cluster to a neighboring cluster. The method includes a step 904 of substituting heuristics to estimate cost from a node to the center of the opposite wave front by the approximate cost of travel, in the direction of routing, between a node's cluster and the cluster of the center of the opposite wave. The method includes a step 906 of computing a cost for each link, which is propagating from a destination wave front node, from a time interval based on cluster-approximated arrival time at that node. The method includes a step 908 of when nodes from opposing wave fronts make connections, approximate costs on the target wave are substituted by a newly computed cost of an actual path from an origin.

Figure 10:
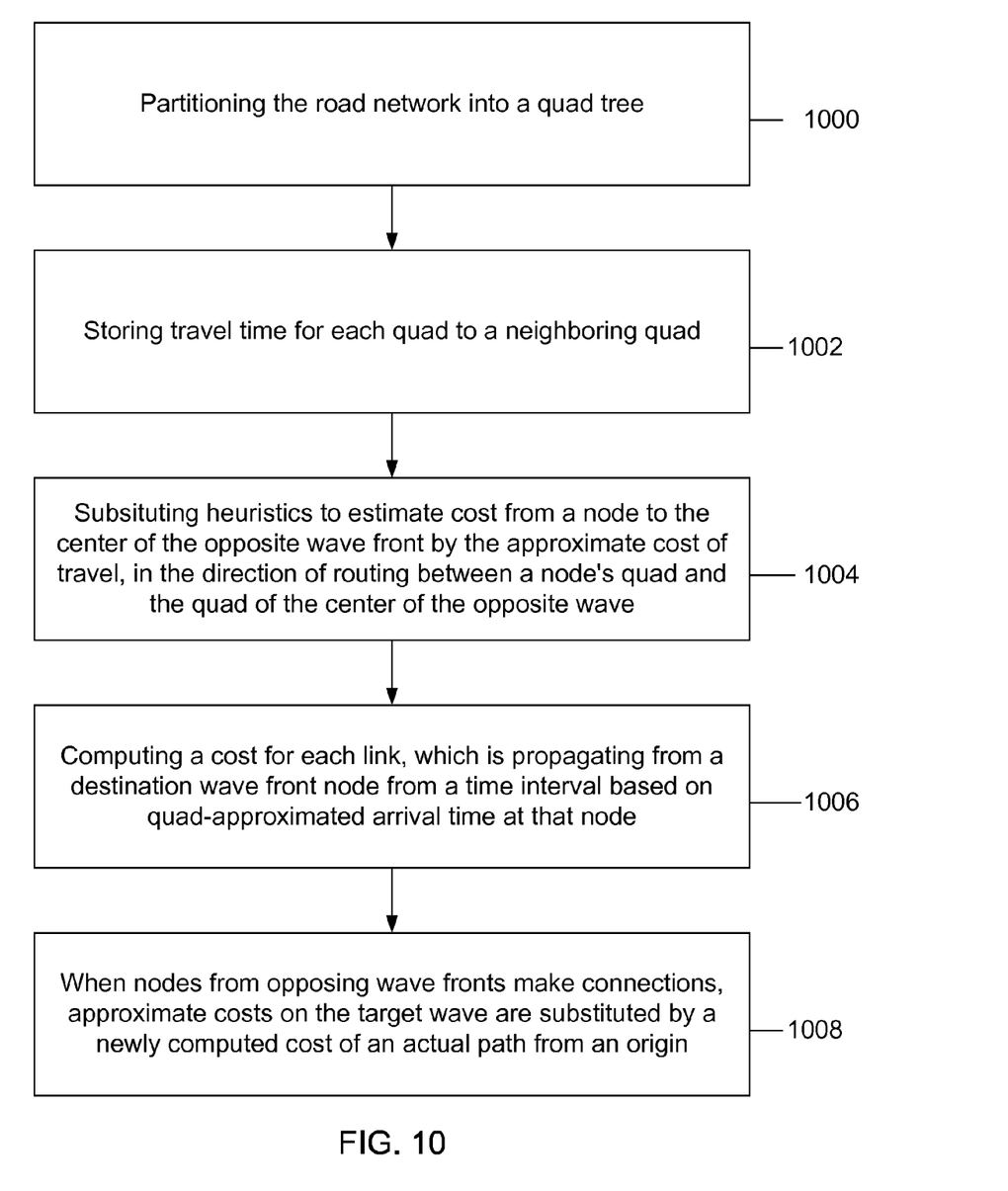
FIG. 10 is a flowchart that shows a method for one embodiment.

FIG. 10 shows a flow chart for one embodiment, which is a method for improving computation of vehicle navigation on a road network. The method includes a step 1000 of partitioning the road network into a quad tree. The method includes a step 1002 of storing travel time for each quad to a neighboring quad. The method includes a step 1004 of substituting heuristics to estimate cost from a node to the center of the opposite wave front by the approximate cost of travel, in the direction of routing, between a node's quad and the quad of the center of the opposite wave. The method includes a step 1006 of computing a cost for each link, which is propagating from a destination wave front node, from a time interval based on quad-approximated arrival time at that node. The method includes a step 1008 of when nodes from opposing wave fronts make connections, approximate costs on the target wave are substituted by a newly computed cost of an actual path from an origin.

Figure 11:
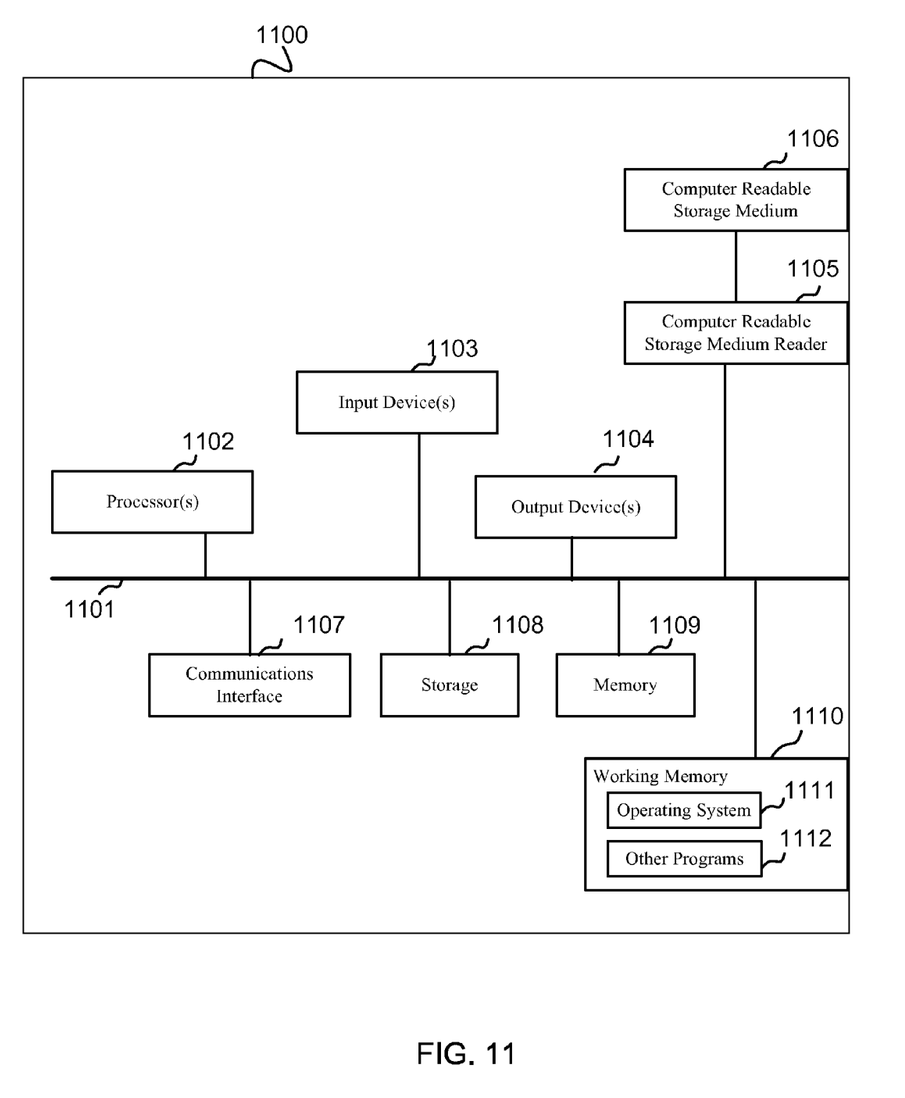
FIG. 11 is a hardware block diagram of an example computer system, which may be used to embody one or more components, in accordance with one embodiment.

FIG. 11 illustrates an exemplary processing system 1100, which can comprise one or more of the elements of FIG. 5. While other alternatives might be utilized, it will be presumed that the components of the system of FIG. 5 are implemented in hardware, software or some combination by one or more computing systems consistent therewith, unless otherwise indicated.

Computing system 1100 comprises components coupled via one or more communication channels (e.g., bus 1101) including one or more general or special purpose processors 1102, such as a Pentium®, Centrino®, Power PC®, digital signal processor ("DSP"), and so on. System 1100 components also include one or more input devices 1103 (such as a mouse, keyboard, microphone, pen, and so on), and one or more output devices 1104, such as a suitable display, speakers, actuators, and so on, in accordance with a particular application. (It will be appreciated that input or output devices can also similarly include more specialized devices or hardware/software device enhancements suitable for use by the mentally or physically challenged.)

System 1100 also includes a computer readable storage media reader 1105 coupled to a computer readable storage medium 1106, such as a storage/memory device or hard or removable storage/memory media; such devices or media are further indicated separately as storage 1108 and memory 1109, which may include hard disk variants, floppy/compact disk, variants, digital versatile disk ("DVD") variants, smart cards, read only memory, random access memory, cache memory, and so on, in accordance with the requirements of a particular application. One or more suitable communication interfaces 1107 may also be included, such as a modem, DSL, infrared, RF or other suitable transceiver, and so on for providing inter-device communication directly or via one or more suitable private or public networks or other components that may include but are not limited to those already discussed.

Working memory 1110 further includes operating system ("OS") 1111 elements and other programs 1112, such as one or more of application programs, mobile code, data, and so on for implementing system 1100 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 1112 may further, for example, include one or more of activity systems, education managers, education integrators, or interface, security, other synchronization, other browser or groupware code, and so on, including but not limited to those discussed elsewhere herein.

Embodiments can include computer-based methods and systems which may be implemented using a conventional general purpose computer(s) or a specialized digital computer(s) or microprocessor(s), programmed according to the teachings of the present disclosure. Appropriate software coding can readily be prepared by programmers based on the teachings of the present disclosure.

Embodiments can include a computer readable medium, such as a computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling the hardware of a computer, such as a general purpose/specialized computer(s) or a microprocessor(s), and for enabling them to interact with a human user or other mechanism utilizing the results of the present invention. Such software may include, but is not limited to, device drivers, operating systems, execution environments/containers, and user applications.

Embodiments can include providing code for implementing processes. The providing can include providing code to a user in any manner. For example, the providing can include providing the code on a physical media to a user; or any other method of making the code available.

Embodiments can include a computer-implemented method for transmitting the code which can be executed at a computer to perform any of the processes of embodiments. The transmitting can include transfer through any portion of a network, such as the Internet; through wires; or any other type of transmission. The transmitting can include initiating a transmission of code; or causing the code to pass into any region or country from another region or country. A transmission to a user can include any transmission received by the user in any region or country, regardless of the location from which the transmission is sent.

The foregoing description of preferred embodiments has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A method for computing a navigable route on a road network represented by an electronic map, the method comprising:
    identifying, by a processor, one or more portions of the road network as being more preferable than normal based on real-time data;
    expressing, by the processor, the one or more portions of the road network as a sequence of locations comprising a uniquely identifiable path;
    accessing, by the processor, the electronic map, wherein the electronic map comprises a hierarchical network having a plurality of levels and comprising a plurality of nodes and links at each level;
    using the sequence of locations comprising the uniquely identifiable path to modify the hierarchical network by adding one or more links between nodes at one or more levels of the hierarchical network, the adding comprising promoting the one or more links within the hierarchical network so that the one or more links are made available for use by a path-finding algorithm for determining routes from origins to destinations when using links from corresponding levels of the hierarchical network;
    enabling, by the processor, the path-finding algorithm to determine a route from an origin to a destination using the hierarchal network modified with the added one or more links, such that the route is adjusted according to the real-time data; and
    outputting, by the processor, the determined route.

2. The method of claim 1, wherein the real-time data includes traffic conditions.

3. The method of claim 1, wherein a cross-reference table maps road network IDs as used by a traffic data provider into road network IDs as used by the processor.

4. The method of claim 3, wherein the cross-reference table is used to identify, based on the real-time data, nodes and links in the hierarchical network that are to be modified.

5. The method of claim 1, wherein the real-time data comprises data about traffic conditions that is supplied by an external source.

6. The method of claim 1, wherein using the sequence of locations comprising the uniquely identifiable path to modify the hierarchical network by adding the one or more links between the nodes at the one or more levels of the hierarchical network comprises adding links to two or more levels of the hierarchical network.

7. The method of claim 1, wherein the one or more links that are added to the one or more levels of the hierarchical network are supplied to the path-finding algorithm in a same way as other links from the one or more levels of the hierarchical network.

8. The method of claim 1, wherein the real time data includes externally provided detours.

9. The method of claim 1, wherein adding the one or more links between the nodes at the one or more levels of the hierarchical network comprises:
  associating the one or more links with corresponding priorities; and
  compounding the one or more links based on a type of compounding associated with the one or more levels.

10. The method of claim 1, wherein the electronic map further comprises, integrated into the hierarchical network, preprocessed routing data computed using one or more environmental profiles.

11. The method of claim 10, wherein the preprocessed routing data computed using the one or more environmental profiles is merged and used in the route determination.

12. The method of claim 1, wherein each link has an assigned cost representing a speed of traversal on the link or a time required to traverse to the link.

13. The method of claim 1, wherein the path-finding algorithm determines routes from origins to destinations using links from only a subset of the levels of the hierarchical network.

14. A computer readable storage medium storing instructions for computing routing on a road network according to the method set out in claim 1.

15. A non-transitory computer-readable medium which stores a set of instructions that, when executed by a processor, causes the processor to perform a method for computing a navigable route on a road network represented by an electronic map, the method comprising:

identifying one or more portions of the road network as being more preferable than normal based on real-time data;

expressing the one or more portions of the road network as a sequence of locations comprising a uniquely identifiable path;

accessing the electronic map, wherein the electronic map comprises a hierarchical network having a plurality of levels and comprising a plurality of nodes and links at each level;

using the sequence of locations comprising the uniquely identifiable path to modify the hierarchical network by adding one or more links between nodes at one or more levels of the hierarchical network, the adding comprising promoting the one or more links within the hierarchical network so that the one or more links are made available for use by a path-finding algorithm for determining routes from origins to destinations when using links from corresponding levels of the hierarchical network;

enabling the path-finding algorithm to determine a route from an origin to a destination using the hierarchal network modified with the added one or more links, such that the route is adjusted according to the real-time data; and outputting, by the processor, the determined route.

* * * * *